United States Patent [19]
Drozdz et al.

[11] Patent Number: 5,898,282
[45] Date of Patent: Apr. 27, 1999

[54] CONTROL SYSTEM FOR A HYBRID VEHICLE

[75] Inventors: Piotr Drozdz, Vancouver; Douglas Yip, North Vancouver, both of Canada

[73] Assignee: B.C. Research Inc., British Columbia, Canada

[21] Appl. No.: 08/910,572

[22] Filed: Aug. 1, 1997

[30] Foreign Application Priority Data

Aug. 2, 1996 [CA] Canada .................................. 2182630

[51] Int. Cl.$^6$ .................................................... B60L 11/12
[52] U.S. Cl. ........................... 318/139; 318/368; 318/376; 318/432; 180/65.4
[58] Field of Search ..................................... 318/139, 366, 318/368, 376, 377, 430, 432, 459; 180/65.1, 65.2, 65.3, 65.4, 65.8; 290/9, 14, 17, 22, 25, 40 R, 45, 50, 51

[56] References Cited

U.S. PATENT DOCUMENTS

| 4,187,436 | 2/1980 | Etienne ..................................... 290/27 |
| 5,285,862 | 2/1994 | Furutani et al. ........................ 180/65.4 |
| 5,318,142 | 6/1994 | Bates et al. ............................. 180/65.2 |
| 5,345,154 | 9/1994 | King ......................................... 318/49 |
| 5,589,743 | 12/1996 | King ........................................ 318/139 |

OTHER PUBLICATIONS

T. Suzuki, et al., "Hino Low Emissions and Better Fuel City Bus With New Diesal/Electric Hybrid Engine," Proceedings of the 12$^{th}$ International Electric Vehicle Symposium, Anaheim, California (Dec. 7–9, 1994).

K. Rajashekara, et al., "Propulsion Control System for a 22 Foot Electric/Hybrid Shuttle Bus," Proceedings of the 12$^{th}$ International Electric Vehicle Symposium, Anaheim, California (Dec. 7–9, 1994).

P. Greenfield, "Alternative Routes Down Electric Avenue," Professional Engineering (UC) vol. 81, #15, (Sep. 6, 1995).

M. Valenti, "Hybrid Car Promises High Performance and Low Emmisions," Mechanical Engineering, pp. 46–49 (Jul., 1994).

"Hybrid Drive Systems For Cars," Automotive Engineering, vol. 99, #7, pp. 17–19, (Jul., 1991).

B. Siuru, "Dual–Power Autos Take The Wheel," Mechanical Engineering, pp. 40–44, (Aug., 1990).

S. Birch, et al., "Concepts—Volvo EEC," Automotive Engineering, pp. 75–76, (Jan., 1993).

J. Kenzie, "Volvo Points Way to Practical Clean Car," The Toronto Star, (Jan. 23, 1993).

(List continued on next page.)

Primary Examiner—Bentsu Ro
Attorney, Agent, or Firm—Townsend and Townsend and Crew LLP

[57] ABSTRACT

A control system for a hybrid vehicle ensures the best possible utilization of onboard energy resources for different operating conditions of the vehicle. The control system utilizes a strategy modified in real time depending on the input from sensors measuring vehicle speed, the current and voltage levels at different locations in the system. The vehicle has an auxiliary power unit, at least one energy storage device and at least one electric drive motor for traction. The vehicle has a high load driving condition, a low load driving condition and a regenerative braking condition. A voltage control sets system voltage to a charging voltage in the low load condition and regenerative braking condition, and sets system voltage to an output voltage from the energy storage device for the high load condition. A current control system sets output power from the auxiliary power unit to a charging level in the low load condition and regenerative braking condition, and sets the power level from the auxiliary power unit based on vehicle speed, motor load and state of charge of the energy storage device for the high load condition.

13 Claims, 5 Drawing Sheets

OTHER PUBLICATIONS

P. Drozdz, et al., "A Hybrid Natural Gas Electric Fleet Car," (SAE Techical Paper Series, #961657), Future Transportation Technology Conference, Vancouver Canada (Aug. 5–8, 1995).

T. Cherry, "The LA301 Hybrid Electric Vehicle," (SAE Technical Paper Series, #921540), Future Transportation Technology Conference and Exposition, Costa Mesa, California (Aug. 10–13, 1992).

D. Parish, et al., "Demonstration of Aluminum–Air Fuel Cells in a Road Vehicle," (SAE Technical Paper Series, #891690), Future Transportation Technology Conference and Exposition, Vancouver, BC, Canada (Aug. 7–10, 1989).

A. Keller, et al., "Performance Testing of the Extended-Range (Hybrid) Electric G Van,"(SAE Technical Paper Series, #920439), International Congress and Exposition, Detroit, Michigan (Feb. 24–28, 1992).

G. Skellenger, et al., "Freedom: An Electric–Hybrid Reseaech Vehicle Concept," Proceedings of the International Conference on Hybrid Drive Trains, Zurich, Switzerland, (ETH Zurich Institut fur Energietechnik) (Nov. 9, 1993).

L. Svantesson, "A Comprehensive Environmental Concept for Future Family Cars," Proceedings of the International Conference on Hybrid Drive Trains, Zurich, Switzerland, (ETH Zurich Institut fur Energietechnik) (Nov. 9, 1993).

CONTROL SYSTEM FOR A HYBRID VEHICLE

FIELD OF THE INVENTION

The present invention relates to hybrid electrical vehicles and more specifically to a control system for such vehicles.

DESCRIPTION OF RELATED ART

Hybrid vehicles generally have an electric drive train, an electrochemical battery as an energy storage device and an internal combustion engine. Series hybrid vehicles have no mechanical connection between the internal combustion engine and the drive train, whereas parallel hybrid systems do have a mechanical coupling. A few of these hybrid vehicles exist today, most of them being research vehicles, none of them are presently production vehicles. The control systems for such vehicles are basic. One design includes a full size car with an auxiliary power unit based on a 1.5 to 2 liter internal combustion engine coupled with a high efficiency alternator, a sealed lead-acid or nickel cadmium battery pack allowing for 60 to 90 miles in all electric mode and an electric drive train with AC motors supplying 100 to 200 kW of wheel power. The general approach to run such hybrid vehicles is to activate the auxiliary power unit when the battery state of charge drops below a predetermined level, and shut off the auxiliary power unit when the battery is fully charged. An alternative approach is to use the electric mode at low speeds and activate the auxiliary power unit for high speed cruising. Some of the vehicles have regenerative braking systems wherein the motor provides power for charging the battery when the vehicle is in a regenerative braking mode.

The inherent advantage of a hybrid propulsion system is the ability to operate the primary energy source, such as an internal combustion engine or a fuel cell, at the highest efficiency point. The primary energy source can be also significantly smaller than for a comparable conventional propulsion system, as it has to provide the energy only at the average power level rather than at the peak power. For certain drive cycles, for instance in a heavy city traffic, the power requirements to accelerate the vehicle can be up to ten times higher than the average power needed to negotiate the cycle. However, in present hybrid vehicle systems, the high primary energy source efficiency advantage is largely compromised by the energy losses during repeatable high rate charging and discharging the battery.

SUMMARY OF THE INVENTION

It is an aim of the present invention to provide an efficient control system for a hybrid vehicle, the hybrid vehicle having a single primary source of energy for energy generation and one or more secondary sources of energy for energy storage and conversion. Examples of primary energy sources include internal combustion engines, fuel cells and metal air cells. The primary energy source generates electrical energy to drive the traction motor and charge the secondary source of energy. The electrical energy from the primary source is connected by an electronic power supply unit into a form suitable for the specific device, for example an AC alternator converts AC to a DC signal to charge a battery.

A motor and drive system power the vehicle, the motor being controlled in response to driver commands and regenerative braking may also be provided. Accessory equipment such as lights, etc., also draw power from either the battery or the primary energy source.

The present invention is applicable for vehicles utilizing primary energy sources such as any one or combination of gasoline, diesel and alternative fuel piston engines and gas turbines, for example, methanol, ethanol, natural gas, hydrogen, biodiesel, propane, dimethyl ether, fuel cells, for example, proton exchange membrane, alkali, phosphoric acid, etc., and metal air batteries, such as aluminum air, zinc air, iron air, etc. The secondary sources of energy include but are not limited to electrochemical batteries such as lead acid, nickel cadmium, nickel metal hydrates, nickel iron, lithium ion, lithium metal sulfates, etc., mechanical storage devices such as flywheels and electrical storage devices such as ultracapacitors. Examples of hybrid systems include an internal combustion engine, an electrochemical battery, in some instances including a flywheel or ultracapacitor; fuel cell and an electrochemical battery; fuel cell, a flywheel and/or an ultracapacitor, and a metal air cell and electrochemical battery.

The control system provides a dynamic control of the hybrid vehicle to ensure the best utilization of the onboard energy resources for the given operating conditions. This can be accomplished by controlling the output level of the auxiliary power unit (primary energy source) to ensure the highest possible combined efficiency of primary energy generation and energy exchange with the storage device. For example, in a system consisting of an engine/generator set and an electrochemical battery, the engine output should be selected to minimize thermal and mechanical engine losses and reduce the battery use to minimum regardless of road load conditions. The control system utilizes a strategy modified in real time depending on the input from sensors measuring the vehicle speed, the current and voltage levels at different locations in the system. An onboard computer continuously calculates the state of charge of the energy storage device such as the battery and the motor load and analyzes the statistical parameters of the energy storage device and motor load history. An expert system algorithm is provided to detect patterns and current operating conditions. The control program defines the conditions under which the control strategy is modified and performs the hardware control functions. The variable parameters of the system, which are set by the control program, are maximum and minimum levels of the state of charge of the energy storage device for activation of the auxiliary power unit, and the power output from the auxiliary power unit as well as the energy storage device.

The present invention provides a control system for a hybrid vehicle having an auxiliary power unit at least one energy storage device and at least one electric drive motor for traction, the vehicle having a high load driving condition, a low load driving condition and a regenerative braking condition, the control system comprising: a voltage control to set system voltage to a charging voltage of the energy storage device in the low load driving condition and the regenerative braking condition, and to set the system voltage to an output voltage from the energy storage device for the high load driving condition, a current control system to set output power from the auxiliary power unit to a charging level for the energy storage device in the low load driving condition and the regenerative braking condition, and to set the power level from the auxiliary power unit based on vehicle speed, motor load, and state of charge of the energy storage device for the high load driving condition, and control means to switch on the auxiliary power unit when the state of charge of the energy storage device is below a predetermined level and switch off the auxiliary power unit when the energy storage device is fully charged.

The present invention also provides a method of controlling a hybrid vehicle having an auxiliary power unit, at least one energy storage device and at least one electric drive motor for traction, the vehicle having a high load driving condition when the motor is powered by the auxiliary power unit and the energy storage device, a low load driving condition when the auxiliary power unit provides power to the motor and to charge the energy storage device, and a regenerative braking condition when the auxiliary power unit and the motor provide power to charge the energy storage device, comprising the steps of: controlling system voltage to a charging voltage of the energy storage device in the low load driving condition and the regenerative braking condition, controlling the system voltage to an output voltage from the energy storage device for the high load driving condition, controlling the output power from the auxiliary power unit to a charging level for the energy storage device in the low load driving condition and the regenerative braking condition, controlling the output power from the auxiliary power unit to a level determined from statistical analysis of vehicle speed, motor load and state of charge of the energy storage device for the high load driving condition, and controlling the operation of the auxiliary power unit to provide power to charge the energy storage device when the state of charge of the energy storage device is below a predetermined level.

BRIEF DESCRIPTION OF THE DRAWINGS

In drawings which illustrate embodiments of the present invention.

DESCRIPTION OF THE PREFERRED EMBODIMENTS

Figure 1:
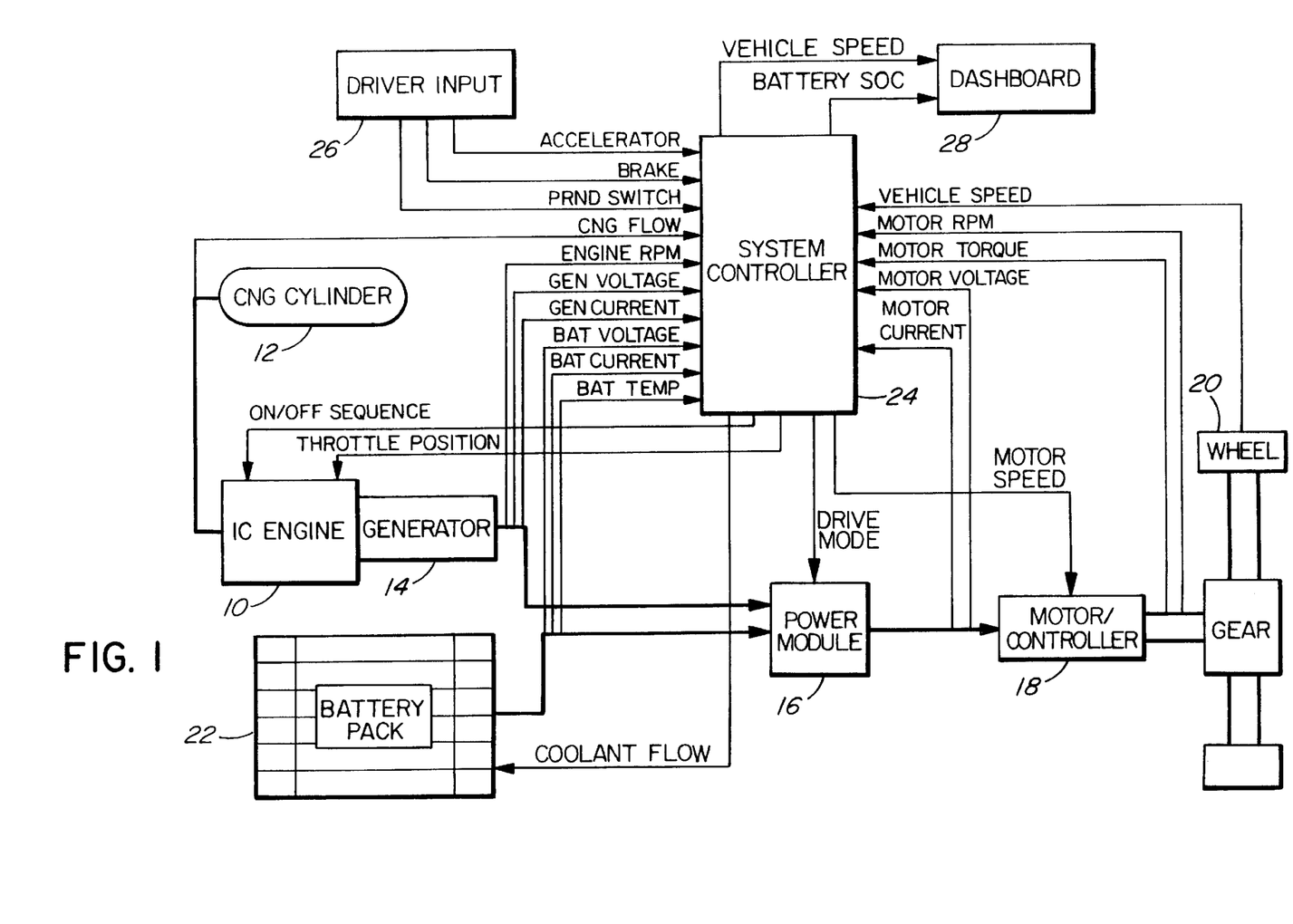
FIG. 1 shows a schematic diagram of a hybrid vehicle control according to one embodiment of the present invention.

FIG. 1 shows a hybrid vehicle control system which comprises an auxiliary power unit in the form of an internal combustion engine 10 powered from a compressed natural gas cylinder 12, the engine 10 drives a generator 14 which produces power through a power module 16 to drive a motor 18 which in turn powers the traction wheels 20. A battery pack 22 and the power module 16 are connected in parallel so that the DC current flow pattern between the battery pack 22, the power module 16 and the traction motor 18 is dependent on the impedance of the components. Information regarding the vehicle speed, state of charge for the battery, is illustrated on the dashboard 28.

The system controller 24 has three typical driving modes. A high load driving condition which is generally used for acceleration or hill climbing. The high load driving condition is used for short durations. In this high load driving condition power from the generator 14 and the battery pack 22 is fed through the power module 16 to the motor 18. A low load driving condition occurs when the motor power demand does not exceed the generator output power. This is typical for low speed cruising with gentle acceleration or shallow inclines. In this condition, the generator 14 provides all power required by the motor 18 and the remaining output is used to charge the battery pack. It is possible during a prolonged operation on a low load mode that the battery state of charge can exceed a predetermined maximum allowable level. The system controller 24 has the capability to reduce the output or shut down the auxiliary power unit 10 to allow the discharge of the battery pack 22 to allowable state-of-charge range.

A regenerative braking mode occurs during braking. Since the deceleration rate is usually several times higher than the acceleration mode, the drive motor 18 can absorb only a fraction of energy generated and the remainder must be dissipated as heat in mechanical brakes. The regenerative energy from the drive motor 18 is used to charge the battery pack 22. In this condition the generator 14 may also be charging the battery pack 22.

The control system maximizes utilization of energy available from the battery pack 22 and from the generator 14. There may be additional operating modes for a vehicle depending upon a vehicle purpose and operator preferences. Typical options are a fully electric mode with external battery charging and a high charge hybrid mode when the auxiliary power unit is operated at full power to recharge the battery pack. These modes can be selected by a vehicle operator to override an automatic control system.

The system controller 24 manages the power flow between the battery pack 22, the generator 14 and the motor 18. The system consists of a set of transducers measuring the system parameters, a central processor managing system operation, power electronics controlling the current flow between the system components, a traction motor controller, battery thermal management system and power unit controller. The driver input 26 is typically generated by an accelerator, brake or driving mode selector. Other drive controls, i.e., climate controls, etc., may be incorporated in the main system or controlled by a separate unit. A data acquisition system which is part of the system controller encompasses a set of transducers and signal conditioners to measure voltage and current at different locations, engine, motor and wheel speed, temperatures of critical components, and specific conditions relevant to the auxiliary power unit such as fuel and coolant pressure and flow, oil pressure and temperature, etc.

The vehicle system controller 24 receives signals from the driver and digitized data from the data acquisition system and performs data processing, then executes the control program and sends control signals to the appropriate devices and displays the basic parameters and error messages on the dashboard 28.

The control system 24 provides energy management and also detects faults. The energy management function involves calculation of traction power requirements based on magnitude and rate of driver's input, calculation of the state of charge of the battery from battery output power and battery output voltage, also voltage time history, taking into account battery temperature and battery age. The controller calculates a required generator output power based on analysis of road load history which is determined from motor current and voltage data. Variation to the auxiliary power unit output is made by the system controller 24 sending a signal to the auxiliary power unit 10 to set the current limit of the power electronics module. The power module current limit determines the auxiliary power unit load. The load can vary, depending on vehicle's operating conditions and the auxiliary power unit must include a separate control module to maintain its stability. For instance, in the case of an internal combustion engine, the engine speed is maintained constant by a separate throttle or injector control (not shown).

The diagnostic function of the system involves continuous monitoring of system voltage and current at different locations to prevent overloading, as well as monitoring of component temperatures and fuel and oil pressures. Since the battery pack 22 may consist of modules connected in parallel, voltage of each battery string is monitored to detect non-uniform loads potentially leading to the battery pack failure.

The traction motor controller function is to modify motor armature and field parameters to achieve required speed and torque. The motor controller is largely independent from the overall control system. The function of the remaining elements of the system is to provide adequate voltage and current to the motor.

Figure 2:
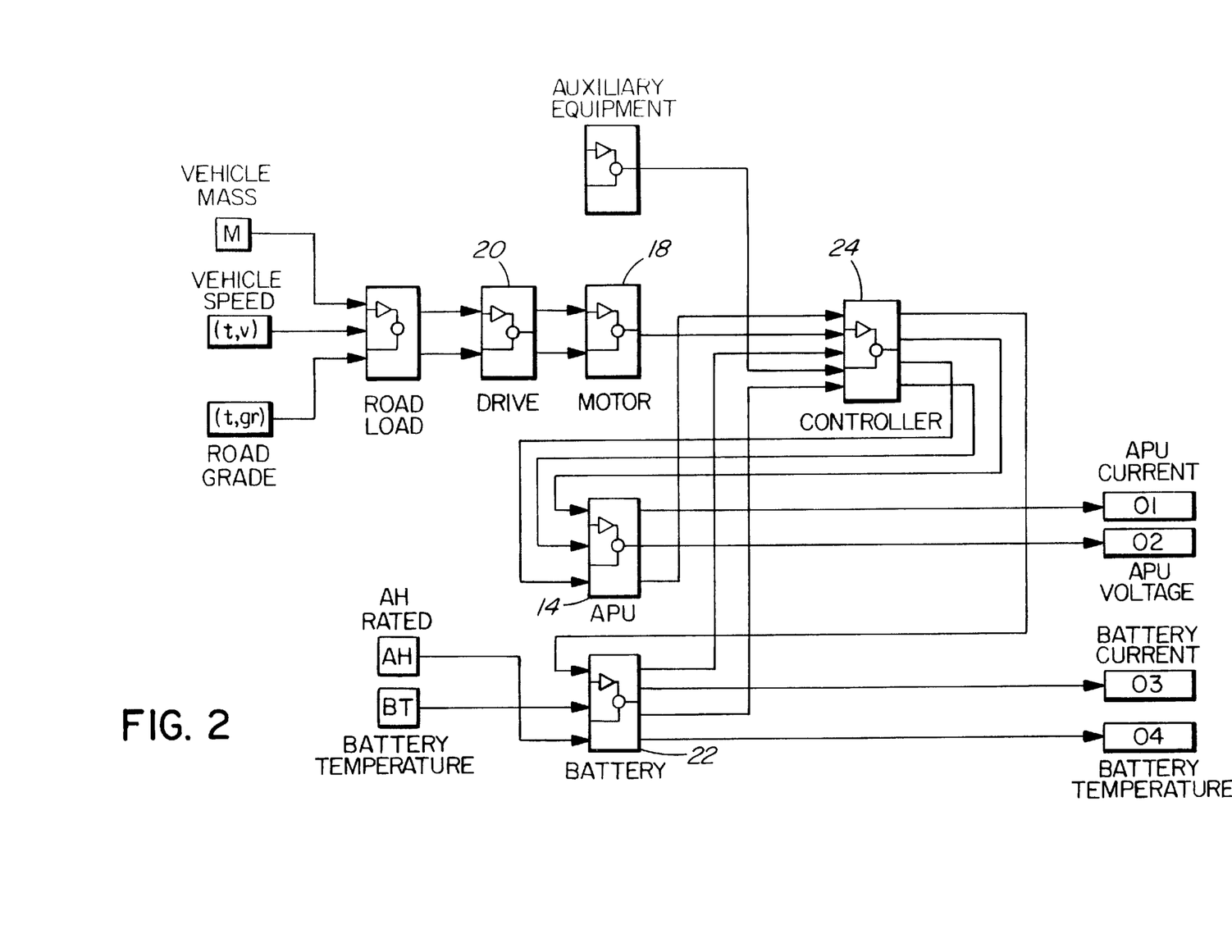
FIG. 2 shows a block diagram of the hybrid vehicle control system of FIG. 1, FIGS. 3, 4 and 5 show graphs of different driving cycles for current and speed against time.

A block diagram of the hybrid controller simulation model is shown in FIG. 2 with each of the major sub-systems represented by a functional block containing at least one lower level. The road load on the motor shaft is calculated for rolling resistance, aerodynamic drag, hill climbing force and acceleration torque demand. The required road load torque is converted into an electric power necessary to provide the required motor speed and torque at a given efficiency. Motor characteristics are calculated for a given operating condition. The motor power demand is passed on to the controller which is compared to the available power from the battery and the generator 14. If the load power is less than the generator output, the battery is bypassed and the generator provides all required power. The generator voltage is adjusted to the level required to charge the battery and the current limit set to the required power level. The system includes the battery charging characteristic in the voltage loop so the generator voltage always corresponds to the optimum battery charging conditions. In the event that the motor load exceeds the generator output, the generator voltage level is adjusted to a discharge voltage corresponding to the instantaneous battery state of charge and the battery temperature. The battery provides motive power with the generator working at the maximum current limit condition. The controller ensures the best strategy to control the generator 14 and battery 22 to ensure the maximum system efficiency.

The battery temperature is measured and if the battery is outside a predetermined temperature range, then either a coolant is fed to cool the battery pack (as shown in FIG. 1) or, alternatively, in winter months a heater is turned on to heat the battery pack 22.

The generator 14, battery pack 22 and motor 18 are connected electrically in parallel. Depending on the voltage setting, the current can flow from the generator 14 and the battery pack 22 to the motor 17 (high load driving condition), from the generator 14 to the motor 18 and the battery pack 22 (low load driving condition), or from the motor 18 and generator 14 to the battery pack 22 (regenerative braking condition).

The battery pack 22 is used to provide extra power for acceleration and high speed driving in the high load driving condition. At lower loads the motor 18 is driven directly by the generator 14 with the superfluous energy charging the battery pack 22. At high loads the battery pack 22 and the generator 14 jointly supply the power to the motor 18. The regenerative braking energy from the motor 18 is also combined with the generator output to provide a charging pulse for the battery pack 22.

In the operating modes, the system voltage is controlled and the current from the generator 14 is controlled. The system voltage is set to a level equivalent to the battery charging voltage (and this depends on the battery type and size) for the low load driving condition and the regenerative braking condition. For the high load driving condition, the system voltage is controlled by the battery pack 22, thus the maximum voltage from the battery pack 22 represents the system voltage. The generator 14 operates in a current limit mode when the battery pack 22 is charging and during regenerative braking to prevent current backflow.

The control strategy of the system is based on the principle of minimizing the battery state-of-charge fluctuation and auxiliary power unit load leveling. The generator 14 generates a constant output power which can be adjusted to reflect the current energy requirements of the system. The power level is determined by the controller from the statistical analysis of the vehicle speed, motor load and battery state of charge history. Motor load is determined from voltage and current measurements, while the battery state of charge is obtained by integrating battery current and voltage and comparing it to the initial capacity with compensation for battery temperature and current state of charge. Vehicle speed, motor voltage and current, auxiliary power unit voltage and current and battery voltage and current data are sampled and stored in data buffers. The sampling frequency and the length of the buffers may vary depending on the system characteristics and vehicle's operating regime. Two types of data buffers are used: a short one (30–90 seconds) for control purposes and a long one (300–500 seconds) for driving pattern recognition. The contents of the buffers is numericially integrated and divided by the buffer length to provide an average value of the monitored parameter over the time period. Motor energy consumption, auxiliary power unit energy and the energy exchanged with the battery are calculated by multiplying the respective current and voltage values. If during the monitored time period a net battery discharge is observed, the generator output is increased. The generator output is decreased when the battery state of charge has increased during the monitored period. The magnitude of the auxiliary power unit output adjustment is proportional to the battery discharge energy during the monitored period. The maximum and minimum limits of the auxiliary power unit output are determined based on the average values of the long data buffers. The specific relationships between the auxiliary output range and motor load history are determined experimentally for a given vehicle and programmed in form of look-up tables. The generator output is calculated and adjusted by setting an appropriate current limit on the power module.

Since the battery pack 22 is usually the weakest link of the drive train in terms of its efficiency and durability, the system maintains best possible battery output power by reducing the load and controlling the battery temperature. A thermal management function of the system maintains the battery temperature in optimum limits. A battery cooling function is provided to cool the temperature of the battery if it rises above a prescribed level and in cold weather an integrated electrical heater system provides the energy to maintain the battery above a minimum preset temperature.

Figure 3:
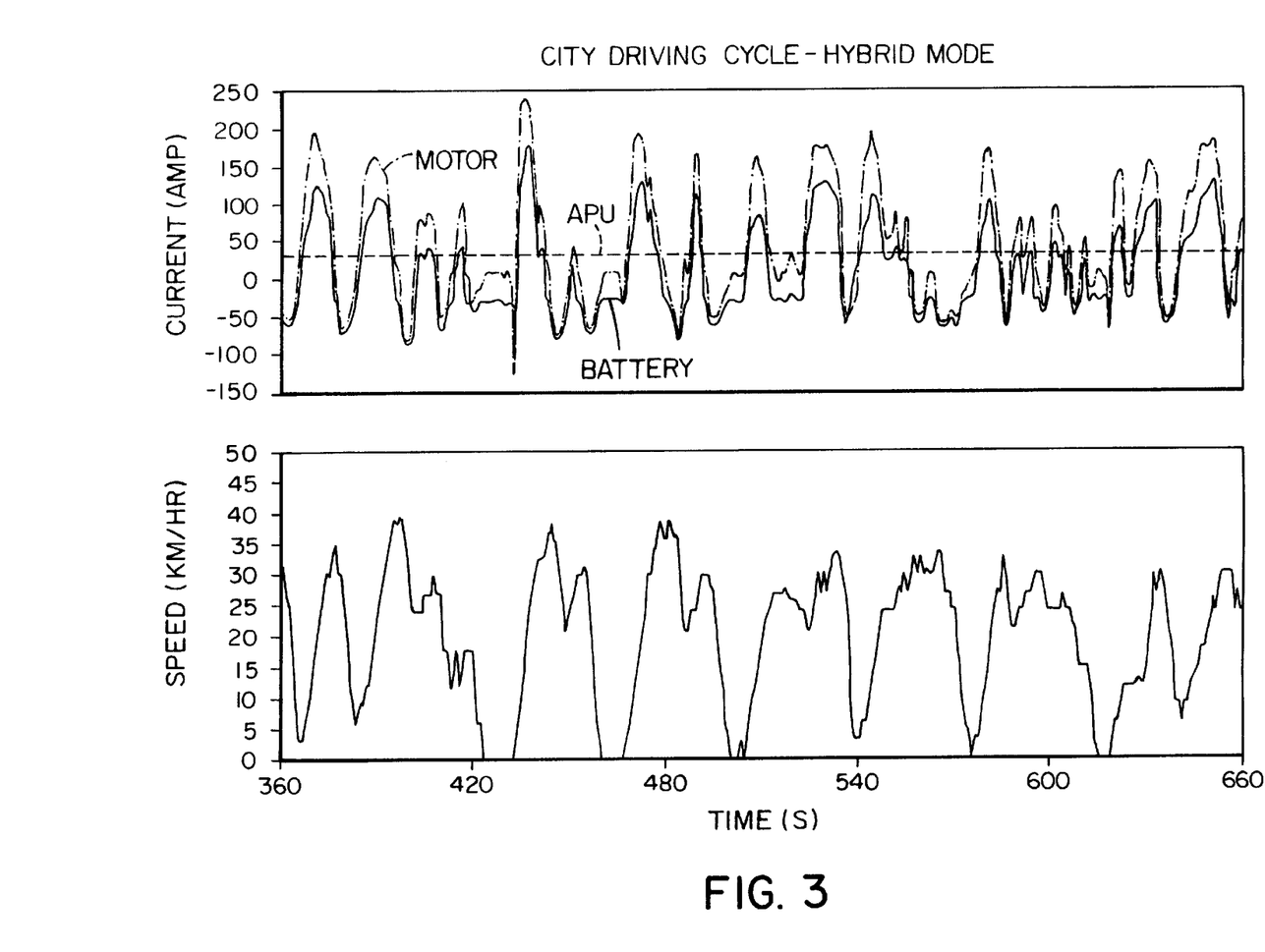
Figure 4:
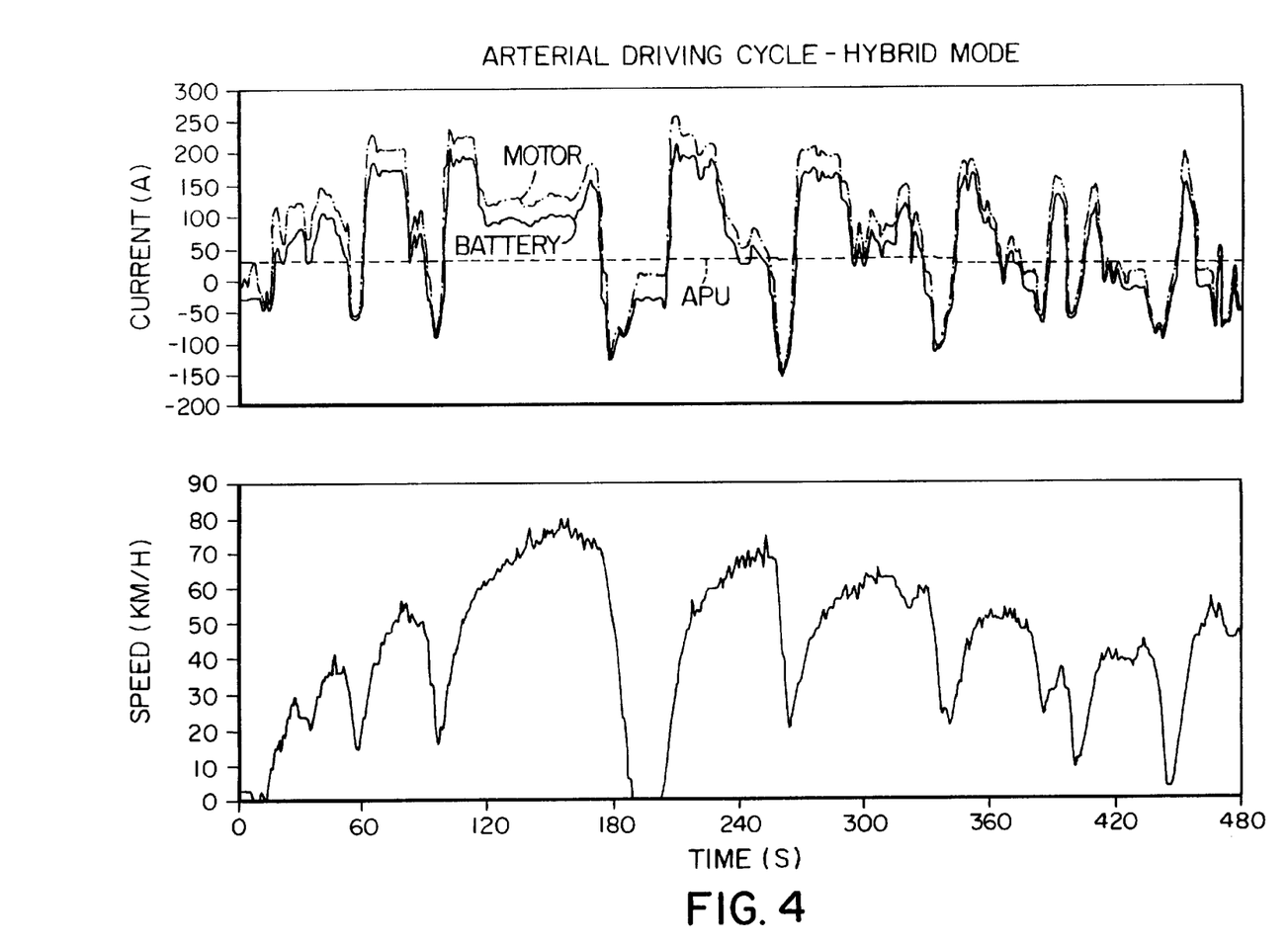
Figure 5:
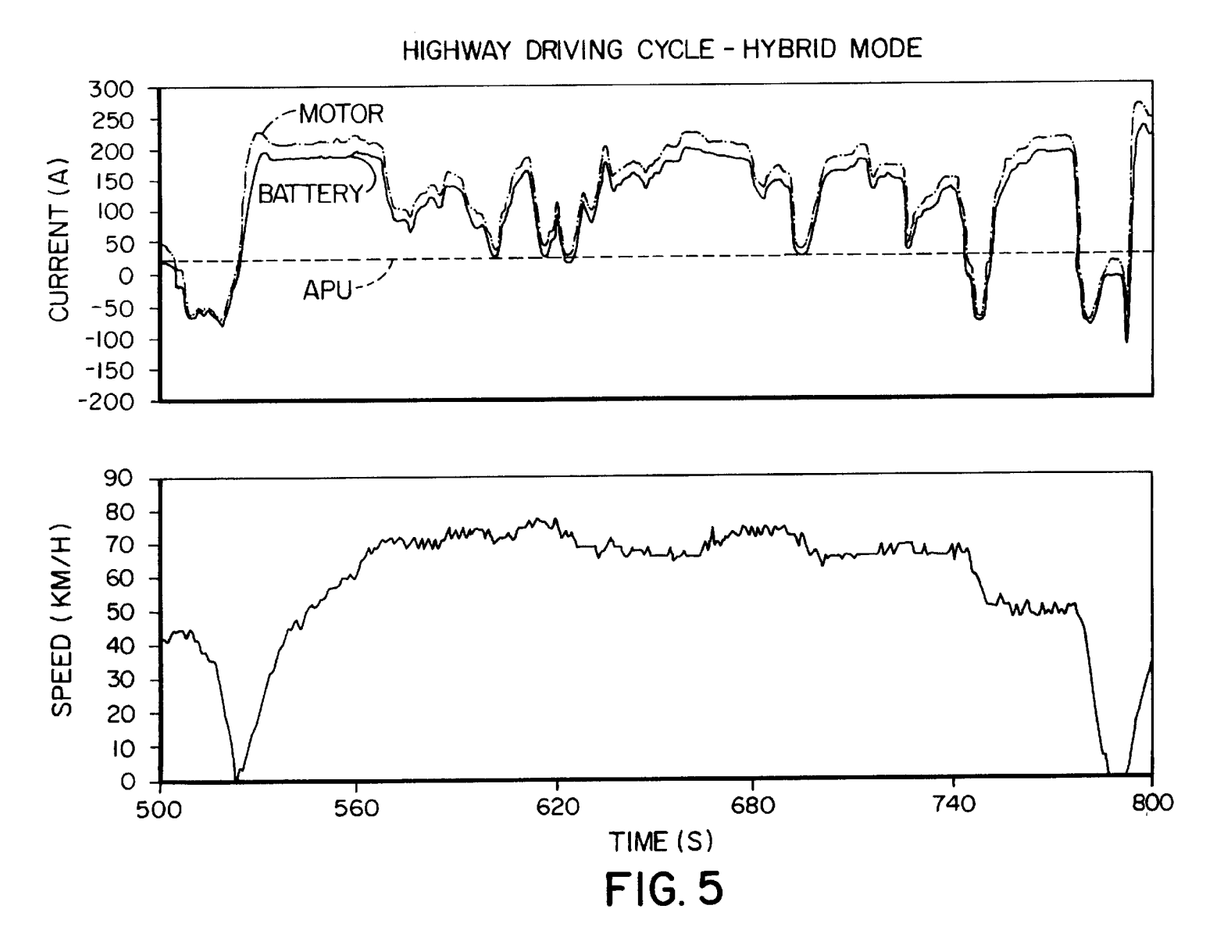

The control concept has been verified by combination of a hybrid vehicle road tests and numerical simulation. A hybrid electric cargo van with a 45 kW DC motor and 7 kW auxiliary power unit consisting of a CNG-fueled engine and an alternator, was driven in typical urban traffic conditions. Specific test conditions included city routes with frequent stops and low average speeds, arterial driving with occasional stops and higher speed and highway cruising without stops. FIGS. 3, 4 and 5 present measured motor, battery and auxiliary power unit current data, as well as the vehicle speed on selected routes. The voltage and current data collected during the tests indicate that the proposed system provides good control of auxiliary power unit output and substantially reduces the battery load. The advantage of the system is particularly visible on low speed routes with frequent stops such as rush hour city traffic or delivery routes. Route simulation was conducted for a basic vehicle configuration with two different control strategies. In the first approach it was assumed that the hybrid auxiliary power unit operated on and off at its maximum power level. The engine was allowed to be off only for a short period to minimize battery discharge.

In the second approach, adaptive control, the average energy consumption for a cycle was calculated and adjusted to avoid excessive battery discharge. The generator power load varied depending on the average cycle and the battery load. However, the controller maintained the engine's operating range within optimum limits avoiding fast transients. Adjustments of the generator output power were performed in one minute intervals, based on past history of battery discharge. The basic rule was that if during the preceding one-minute period a net battery discharge was observed, the generator output was increased. The generator power was decreased when the battery state of charge increased. The magnitude of the adjustment was determined from the difference between the battery state of charge at the beginning and the end of the monitored time period. The minimum and maximum limits on the generator power were established from the statistical analysis of the motor load over the cycle. The system efficiency data, including the projected efficiencies of major components, for the above control strategies are shown in Table 1.

TABLE 1

Hybrid Vehicle Efficiency on Selected Routes (%)

| Efficiency | HPU On/Off | Adaptive Control |
|---|---|---|
| Drive Train | 0.75 | 0.75 |
| Battery Round Trip | 0.31–0.38 | 0.34–0.51 |
| Generator Set | 0.79 | 0.79 |
| Regenerative Braking | 0.43 | 0.43 |
| Overall Cycle | 0.34–0.55 | 0.42–0.61 |

HPU is hybrid power unit or auxiliary power unit.

The drive train efficiency includes combined power losses in tires, axle, differential, gear box, traction motor and motor controller. It was found that it was the same for both investigated control strategies and varies slightly between the routes, depending on motor load conditions. A typical value of 75% was assumed for simulation.

The round trip efficiency of the battery represents the total energy loss during discharging and charging of the battery. It is approximately 30% higher for the adaptive control strategy compared to the on/off operation. The battery is the least efficient component in the system, thus management of this critical element is necessary for a successful hybrid system. Simulation data revealed that the average battery use is ten to twenty times lower for the adaptive strategy compared to the on/off control system.

The efficiency of the generator represents the energy losses in the coupling between the engine and the alternator. As shown in Table 1, the overall cycle efficiency representing the ratio of the propulsion energy of the cycle to the total energy output of the auxiliary power engine 10 was typically 25% higher for adaptive control than for the on/off strategy. A typical propulsion system efficiency range achieved for the proposed adaptive control strategy was approximately 42% to 44%. In one condition when the battery was not used frequently, the overall efficiency was over 60%. For comparison the overall propulsion efficiency of a conventional van is in the order of 70% to 75% and this includes tire and axle losses and gearing efficiency.

The results of the test indicate that the control system of the present invention has a potential of improving the energy efficiency of a vehicle by 25% to 30%. If a more efficient battery can be acquired, then the vehicle should be able to achieve the performance of a conventional van.

Various changes may be made to the embodiments shown herein without departing from the scope of the present invention which is limited only by the following claims.

We claim:

1. A control system for a hybrid vehicle having an auxiliary power unit, at least one energy storage device and at least one electric drive motor for traction, the vehicle having a high load driving condition, a low load driving condition, and a regenerative braking condition, the control system comprising:

a voltage control to set system voltage to charging voltage of the energy storage device in the low load driving condition and the regenerative braking condition, and to set the system voltage to output voltage from the energy storage device for the high load driving condition;

a current control to set output from the auxiliary power unit to a charging level for the energy storage device in the low load driving condition and the regenerative braking condition, and to set the power level from the auxiliary power unit based on vehicle speed, motor load and state of charge of the energy device for the high load driving condition; and control means to switch on the auxiliary power unit when the state of charge of the energy storage device is below a predetermined level and switch off the auxiliary power unit when the energy storage device is fully charged;

wherein the output power from the auxiliary power unit is set from statistical analysis of vehicle speed, the motor load and history of the state of charge of the energy storage device.

2. The control system according to claim 1 wherein the auxiliary power unit is selected from the group consisting of: internal combustion engines, fuel cells and metal air cells.

3. The control system according to claim 1 wherein the auxiliary power unit comprises an internal combustion engine with a generator.

4. The control system according to claim 1 wherein the energy storage device is an electrochemical battery.

5. The control system according to claim 4 wherein at least one additional energy storage device is provided selected from the group consisting of a flywheel and an ultracapacitor.

6. A control system for a hybrid vehicle having an auxiliary power unit, at least one electrochemical battery and at least one electric drive motor for traction, the vehicle having a high load driving condition, a low load driving condition, and a regenerative braking condition, the control system comprising:

a voltage control to set system voltage to charging voltage of the electrochemical battery in the low load driving condition and the regenerative braking condition, and to set the system voltage to output voltage from the electrochemical battery for the high load driving condition;

a current control to set output from the auxiliary power unit to a charging level for the electrochemical battery in the low load driving condition and the regenerative braking condition, and to set the power level from the auxiliary power unit based on vehicle speed, motor load and state of charge of the electrochemical battery for the high load driving condition;

control means to switch on the auxiliary power unit when the state of charge of the electrochemical battery is below a predetermined level and switch off the auxiliary power unit when the electrochemical battery is fully charged; and a battery temperature control system with a battery cooling system, the battery temperature control system maintaining the battery temperature within a predetermined range by activating the battery cooling system.

7. The control system according to claim 6 wherein the battery temperature control system reduces the battery output power maintaining maximum battery output power when maintained within the predetermined temperature range.

8. The control system according to claim 6 including a battery heating system controlled by the battery temperature control system.

9. A method of controlling a hybrid vehicle having an auxiliary power unit, at least one energy storage device and at least one electric drive motor for traction, the vehicle having a high load driving condition when the motor is powered by the auxiliary power unit and the energy storage device, a low load driving condition when the auxiliary power unit provides power to the motor and to charge the energy storage device, and a regenerative braking condition when the auxiliary power unit and the motor provide power to charge the energy storage device, comprising the steps of:

controlling system voltage to a charging voltage of the energy storage device in the low load driving condition and the regenerative braking condition;

controlling the system voltage to an output voltage from the energy storage device for the high load driving condition;

controlling the output power from the auxiliary power unit to a charging level for the energy storage device in the low load driving condition and the regenerative braking condition;

controlling the output power from the auxiliary power unit to a level determined from statistical analysis of vehicle speed, motor load and state of charge of the energy storage device for the high load driving condition, and controlling the operation of the auxiliary power unit to provide power to charge the energy storage device when the state of charge of the energy storage device is below a predetermined level.

10. The method of controlling a hybrid vehicle according to claim 9 including determining motor load from the system voltage and power measurement.

11. The method of controlling a hybrid vehicle according to claim 9 including determining the state of charge of the energy storage device by integrating output power from the energy storage device and comparing to output power from a fully charged energy storage device.

12. The method of controlling a hybrid vehicle according to claim 11 including determining the state of charge of the energy storage device with compensation for temperature of the energy storage device and current state of charge.

13. The method of controlling a hybrid vehicle according to claim 9 wherein the energy storage device is an electrochemical battery and including the step of controlling the temperature of the battery within a predetermined temperature range.

* * * * *